(12) United States Patent
Halsall

(10) Patent No.: US 6,293,220 B1
(45) Date of Patent: Sep. 25, 2001

(54) VEHICLE TRAILER ASSEMBLY

(76) Inventor: Kevin Thomas Halsall, 68 Teraupara Road, P.O. Box 46, Otaki (NZ)

( * ) Notice: Subject to any disclaimer, the term of this patent is extended or adjusted under 35 U.S.C. 154(b) by 0 days.

(21) Appl. No.: 09/640,287

(22) Filed: Aug. 16, 2000

Related U.S. Application Data

(63) Continuation of application No. PCT/NZ98/00154, filed on Oct. 12, 1998.

(30) Foreign Application Priority Data

Feb. 18, 1998 (NZ) .................................................. 329803

(51) Int. Cl.⁷ ....................................................... B63B 7/00
(52) U.S. Cl. ............................................................ 114/353
(58) Field of Search ................................... 296/182, 181; 114/353, 352, 354, 363, 357; 280/414.1, 414.2

(56) References Cited

U.S. PATENT DOCUMENTS

| | | | |
|---|---|---|---|
| 2,256,038 | * 9/1941 | Woodruff | 114/344 |
| 3,266,836 | * 8/1966 | Taylor et al. | 280/414.1 |
| 5,314,200 | * 5/1994 | Phillips | 280/400 |

FOREIGN PATENT DOCUMENTS

| | | |
|---|---|---|
| 7793281 | 11/1981 | (AU) . |
| 2190088 | 1/1974 | (FR) . |
| 2565191 | 12/1985 | (FR) . |
| 9600667 | 1/1996 | (WO) . |

* cited by examiner

Primary Examiner—Ed Swinehart
(74) Attorney, Agent, or Firm—Volpe and Koenig, P.C.

(57) ABSTRACT

A vehicle trailer assembly including a flat deck wheeled chassis or sub-assembly detachably mounting an integrally molded plastics main body having a floor part with upstanding opposite side walls and conjoining rounded and forwardly tapering front end part, a plastics transverse tail gate for closing the main body at or between the rear ends of the opposite side walls and hingeably mounted either to a rear end portion of the floor part or to a transverse rear end part of the wheeled chassis or sub-assembly. An integrally molded plastics cover component of inverted dinghy boat or dished form having inclined opposite side walls and a tapering forward end being detachably or hingeably mounted on the main body for closing up of the assembly and providing the trailer body assembly with a streamlined substantially bullet shape. An optional molded plastics intermediate wall component is provided for fitment between the main body and cover compartment to increase the trailer load carrying capacity; and an optional complementary shaped plastics dinghy is provided for mounting inverted on the cover component.

22 Claims, 3 Drawing Sheets

VEHICLE TRAILER ASSEMBLY

This application is a continuation of International Application No. PCT/NZ98/00154 filed on Oct. 12, 1998.

FIELD OF INVENTION

This invention relates to trailer vehicles for towing behind and by vehicles, including on-road and off-road/vehicles, motorised vehicles such as cars and recreational vehicles, motorcycles and pedal cycles/tricycles; and also to childrens plaything versions of trailer vehicles.

OBJECTS OF INVENTION

One aspect of the present invention is to provide a novel and aesthetically pleasing trailer body unit particularly intended for use as (but not necessarily confined) to an on or off road vehicle trailer body unit, which is lightweight but strong and capable of manufacture at relatively low cost, so as to be competitively priced relative to other trailer body units and complete trailer assemblies formed therewith.

Another object of the invention is to provide a versatile trailer body unit and one or more compatible and complementary components for the formation of at least one but preferably a variety of alternative combination trailer vehicle assemblies; and to provide the purchasing public with a useful trailer assembly choice.

The invention includes complete vehicle trailer assemblies to which the aforementioned trailer body units are fitted.

Other and more particular objects and advantages of the invention will become apparent from the ensuing description.

SUMMARY OF INVENTION

According to a first aspect of the invention, there is provided a vehicle trailer body unit having a main body including a floor with conjoined upstanding peripheral front and side wall parts all integrally formed by moulding from a durable substantially rigid setting plastics material; said main body being arranged and adapted to be fitted to a separately formed and provided wheeled chassis or sub-assembly for use as an assembled trailer vehicle. The body unit can be arranged for fitment to an existing or standard flat deck or open frame chassis base wheeled trailer, or a custom built base wheeled trailer can be provided; and the body unit can be arranged for detachable mounting to the chassis or base wheeled trailer, to enable independant use of the latter if required.

The trailer main body may be preformed with a rear end opening between the side wall parts, and which opening is closable by a separately moulded tail gate component of a similar plastics materials and subsequently fitted thereto, or alternatively the separate tail gate component can be fitted by hinging to the rear end of the chassis or base wheeled trailer.

The trailer body can be further or alternatively provided with a complementary and mating upper cover component separately formed by moulding as one integral component from the same durable rigid setting plastics material and subsequently detachably and/or hingeably mounted on the main body; said upper cover component including a roof part with integral depending peripheral wall parts, the lower peripheral edge portions of which are arranged for close fitting abutment or engagement with upper peripheral edge portions of at least the upstanding wall parts of said main body.

The upper cover component lower peripheral portions and mating trailer body upper peripheral portions are provided with catch means for securement of the cover component to the trailer body in the fully closed position; and preferably both the trailer body and upper cover component are of curved exterior streamlined form narrowing to their forward end portions and with the cover component having peripheral wall parts inclined upwardly and inwardly from their lower peripheral edge parts.

In one modification of the invention a supplementary intermediate body component (which can comprise two or more mating parts) is provided for location between the trailer body and the upper cover component to increase the trailer load capacity; said intermediate body component being similarly formed by moulding from the same rigid setting durable plastics material for strength and lightness in weight and having upper and lower peripheral edge parts respectively complementary to and arranged to mate with the upper cover component lower peripheral edges and the trailer body upper peripheral edges; there being lower catch means for positive securement of the intermediate body component to the trailer body unit and upper catch means with which the upper cover component is detachably engageable. The upper cover component may be fixedly attached or fully detachably engageable over said intermediate body component, or mounted for hinged opening relative thereto.

The trailer body unit and in particular the upper cover component thereof may be further adapted to receive and mount an open inverted dinghy; which dinghy is of a size and shape so as to be complementary to the trailer assembly as a whole, and has an open upper periphery and forward end shaped to conform with and, with the dinghy inverted, snugly fit over said upper cover component.

Preferably the dinghy is again formed by moulding from the same durable rigid setting plastics material as is employed for the trailer body and upper cover components.

Other variations and additions to the invention apply.

BRIEF DESCRIPTION OF DRAWINGS

Some preferred aspects of the invention will now be described by way of example and with reference to the accompanying drawing, in which.

DESCRIPTION

Figure 1:
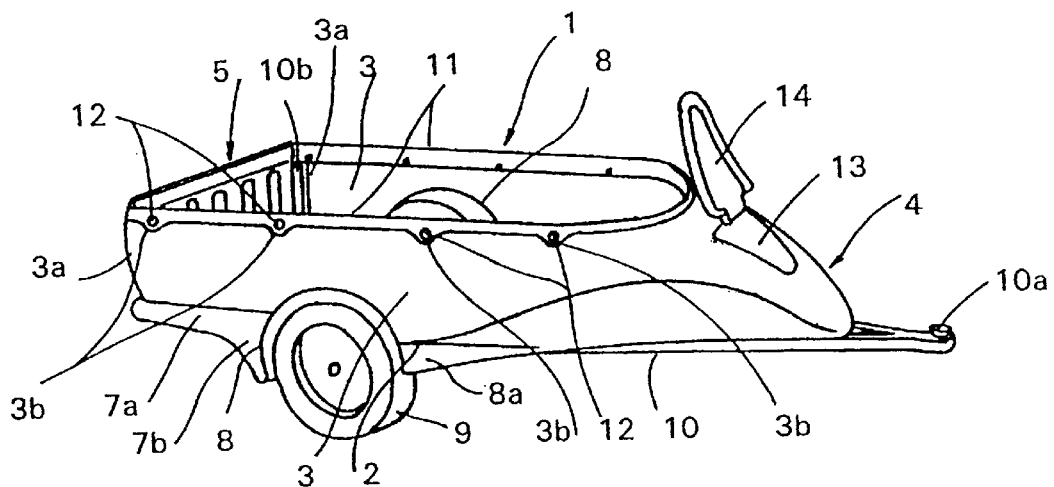
FIG. 1 is a perspective view of a wheeled chassis mounted main trailer body unit trailer assembly.
Figure 2:
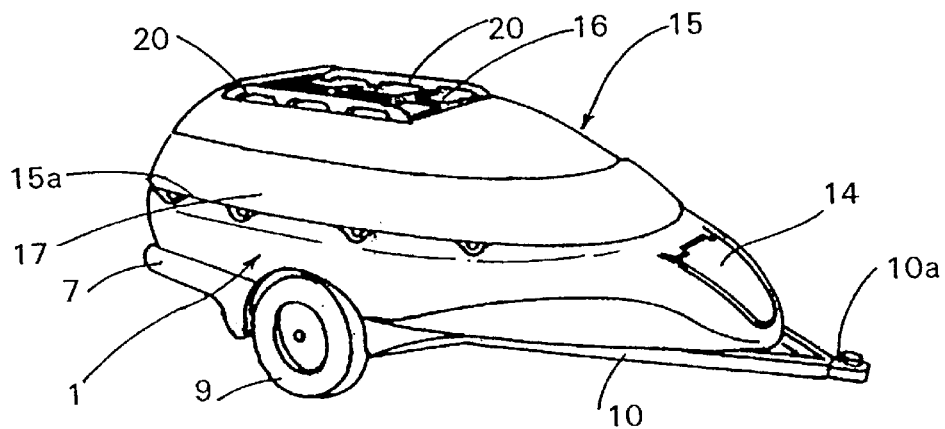
FIGS. 2 and 3 are respectively a front/side perspective view and a rear/side perspective view showing one preferred form of upper cover component fitted to tile base trailer assembly of FIG. 1.
Figure 3:
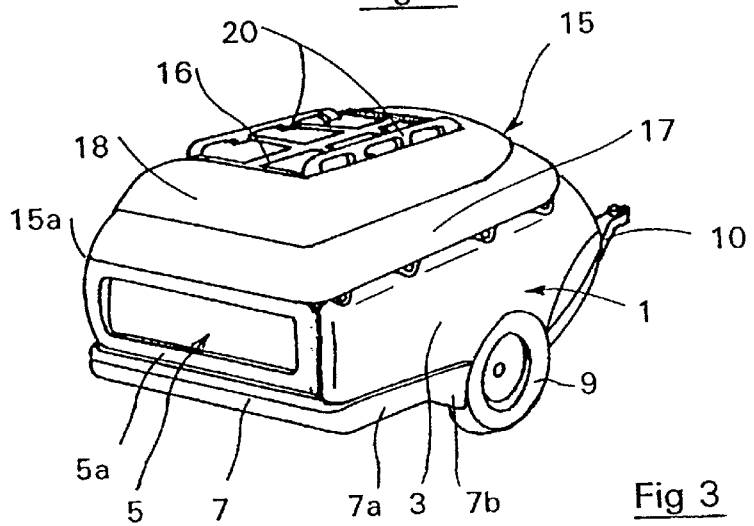
Figure 4:
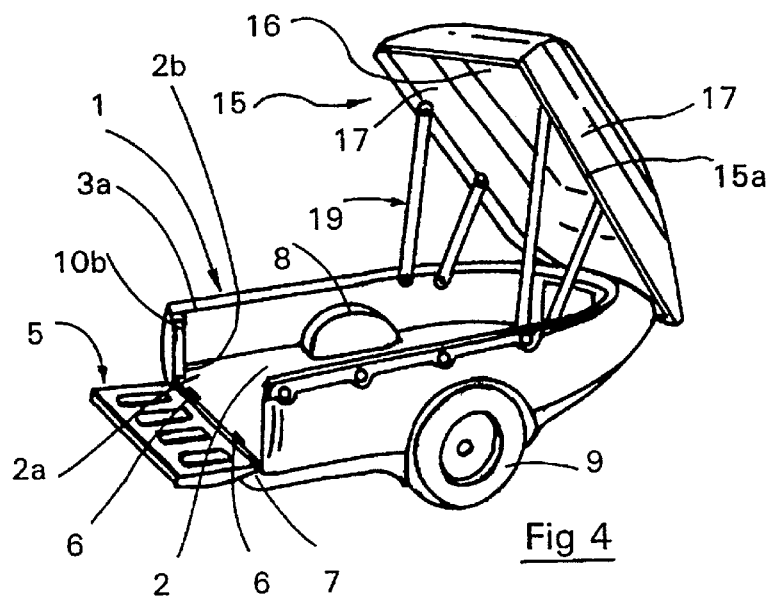
FIG. 4 is a rear/side perspective view of the trailer assembly of FIGS. 2 and 3 and showing the upper cover component hingably mounted and open, and with an open tail gate on the trailer assembly.

Referring firstly to FIG. 1 of the drawings, the basic trailer assembly has a main body unit 1 which is integrally formed by moulding eg by a rotational moulding process, from a durable rigid setting plastics material such as for example a polyethylene or like plastics material, but it will be appreciated that other appropriate materials may of course be utilised. The body unit 1 has a streamlined form with a substantially flat floor part (not seen in FIG. 1 but shown and designated 2 in FIG. 4) having integral upstanding opposite peripheral side wall parts 3 curved upwardly and inwardly and merging with a forwardly tapering and curved and enclosing front end wall part 4. The side wall parts 3 can be conjoined at their rear ends 3a with an integral rear end wall, which is upstanding from and integral with the rear end (2a in FIG. 4) of the floor part 2; but to facilitate loading and unloading of heavier objects and for tire accommodation of longer objects a separately formed transverse hinged tailgate or detachable tailboard is preferably provided. In the illustrated form and referring also now to FIGS. 2, 3 & 4, the assembly includes a tailgate component 5 separately formed, such as by rotational moulding from the same plastics material as the main body 1, and can in one arrangement be hingeably mounted directly to the floor rear end 2a. Any suitable catch or retaining means can be employed to hold the tailgate component 5 in the upright closed position, and stay or flexible link means can be provided to hold the tailgate component 5 in the open rearwardly extending position (as shown in FIG. 4). however, with strong hinges 6 at the tailgate/floor junction and appropriate shaping of the body lower rear end to form a projecting transverse horizontal ledge portion 7 (serving also as a rear integral 'bumper' section with the tailgate component 5 in the closed upright position), and a complementary shaping of the lower outer edge part 5a of the tailgate component 5 to form a mating transverse recess 5a, the tailgate component 5 can be self supporting in the horizontal open position aligned or substantially aligned with the body unit floor.

The side wall parts 3 and adjacent portions of the floor 2 are shaped to define wheel arches 8 for the accommodation of the ground wheels 9 of a separately formed simple metal frame trailer chassis or base 10 on which the trailer main body unit 1 is mounted. The illustrated arrangement provides for use with a chassis or base 10 having a single pair of wheels 9, but of course extended or spaced (or merging) additional arches 8 can be formed for a tandem wheel chassis constructions. The trailer chassis or base 10 is provided with a typical forward projecting part and end towing connection 10a. Whilst the main trailer body 1 is integrally moulded as one piece, it is envisaged that the rear ledge portion 7 can be part of a separately moulded subsection including rear side portions 7a merging into depending mud/stone guard portions 7b at the rear of the wheel arches 8; and this sub-section can be subsequently bonded, bolted or otherwise secured to tile underside of the main trailer body 1 and/or floor 2 thereof. Forward streamlining lower arch fairings 8a can be similarly separately formed and subsequently bonded or otherwise secured to the lower peripheral body portion (or to the chassis 10 as mentioned below) adjacent the forward wheel arch 8 openings.

Figure 5:
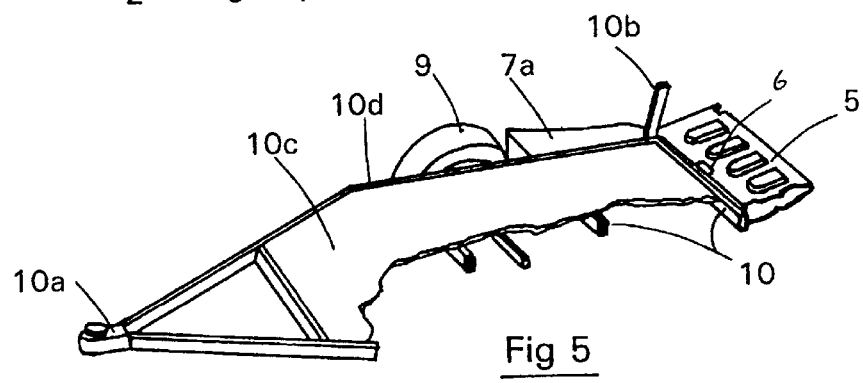
FIG. 5 is a perspective view of one preferred form of wheeled chassis or sub-assembly for the trailer assembly and on which the main trailer body unit is detachably mountable.

In an alternative arrangement, and particularly in the case of a custom built wheeled trailer chassis or base unit 10 such as that shown in FIG. 5 of the drawings, or a similarly modified/adapted existing or 'standard' wheeled trailer chassis or base unit 10; the body rear end or bumper section 7, with side parts 7a and mud/stone guard portions 7b can be separately formed from the plastics material and independently (independent of the main body unit 1) permanently or semi-permanently fixed in the desired location directly onto a rear end part of the metal chassis 10, and the separately formed tailgate component 5 is fixed in position by hinging (by hinges 6) directly to the rear of the metal chassis or base 10 for maximum strength and to also provide an extended load surface to a detachable or fixed a flat deck part 10c of the chassis or base 10 when the main body unit 1 is detached therefrom. Secure but easy fitment and detachment of the main body unit 1 to and from the trailer chassis or base 10 can be provided for example such by metal upstands 10b welded or otherwise securely fixed to the opposite sides of the metal chassis rear end part for location as a close fit through alignable clearance apertures 2b in the floor rear end portion 2a of the body floor 2. Forward end and/or side locating means for the trailer main body unit 1 can also be provided, and for example a short metal upstand (not shown) similar to the rear upstands 10b can be secured to and project upwardly through a forward clearance aperture or recess in the body floor adjacent or within the forward end 4 part of the body unit 1 (eg adjacent or within the compartment mentioned below); and/or the aforementioned forward wheel arch fairings 8a can be integrally moulded with the main body unit 1 (or fixedly secured thereto) and are shaped and positioned so as to be locatable as a close fit adjacent the respective outer side frame portions 10d of the chassis or base 10 to prevent unwanted lateral movement of the main body unit 1 relative thereto. Detachable or releasable catch or clamp means can alternatively be provided for securement of the forward end part of the main body unit 1 to a forward part of tile chassis or base 10.

Whilst not necessary in sonic instances, an upper peripheral reinforcing or reinforced edge strip 11 of tile same plastics material or a stronger material (eg metal) can be separately formed and secured at the upper peripheral edges of the moulded side wall parts 3 and forward end part of tile main body unit 1; and attachment hooks or projections 12 can be mounted in spaced relationship on or below the reinforcing/reinforced edge strip 1 (where provided) for such as load securing ropes or straps, or a tonneau or flexible sheet cover attachment. The side wall parts 3 can have preformed upper recesses 3b in which the hooks or projections 12 are located.

The enclosing tapering forward end 4 of the trailer body 1 can be also closed off at its inner side to define a useful compartment for such as tools, ropes and the like; and a forward compartment access opening 13 is provided in such forward end part 4 and arranged to be closed by a complementary separately formed and hingeably mounted panel or door 14.

A first optional extra for tile assembly is a unitary plastics upper cover component 15, again manufactured such as by a rotational moulding process from the same durable rigid setting plastics as that employed for the trailer main body 1, and which is of inverted boat or dished form with an upper roof part 16 and integral depending and inclined opposite side and conjoining transverse rear end wall parts 17, 18 and a forwardly sloping and inwardly tapering rounded forward end; the shape size and arrangement providing that the lower peripheral edge portions 15a of the cover component and are closely complementary to and can locate and snugly fit over the upper peripheral edge portions (and/or strip 11, where provided) of the trailer body side wall and front end parts 3, 4 and the tailgate 5 upper peripheral edge, to provide a streamlined substantially bullet shaped appearance to the assembly when closed up for travelling.

The upper cover component 15 can be detachably engaged with the main body 1, hingeably mounted at either or both sides, or provided with forward hinge and lift means such as the strut hinge arrangement 19 shown in FIG. 4 (telescopic gas struts or like extensible and self supporting struts can be employed and are preferred). Spring bias means (not shown) can be provided to assist the up and over action of the lower component 15 and to assist in holding the cover component 15 in the fully open position. The upper cover component 15 is securable in position, and preferably lockable in the closed position, by any suitable retaining and/or locking means; and to this end one or more of the aforementioned side hooks or projections 12 can be employed as part of the retaining/locking means. The cover component 15 can also be provided on its upper roof part 16 with such as roof rack members 20 for external luggage or load carriage and may be shaped to provide reinforcement and streamlining for this purpose. It is also envisaged that in medium to large size versions of the trailer assembly the upper cover component 15 having the general shape indicated, and when provided as a detachable unit, may optionally serve as a small dinghy boat (when inverted) for use in calm/still water conditions.

Figure 6:
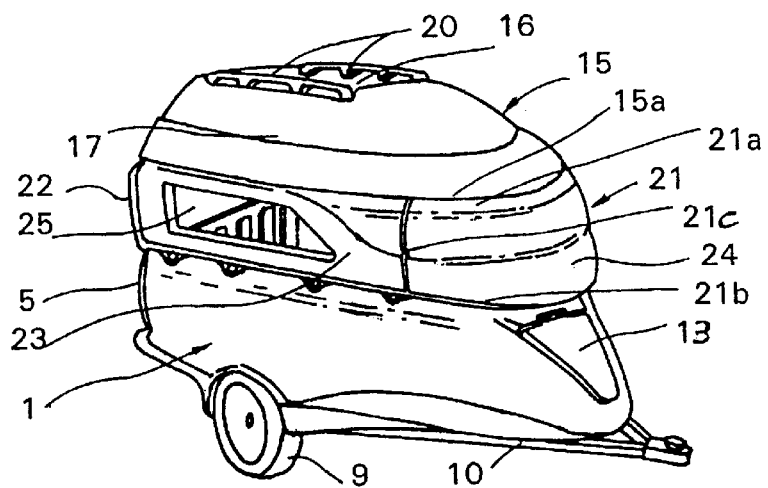
FIG. 6 is a front/side perspective view of the trailer assembly of FIGS. 2 and 3 but with an added optional intermediate body component increasing the trailer assembly capacity.
Figure 9:
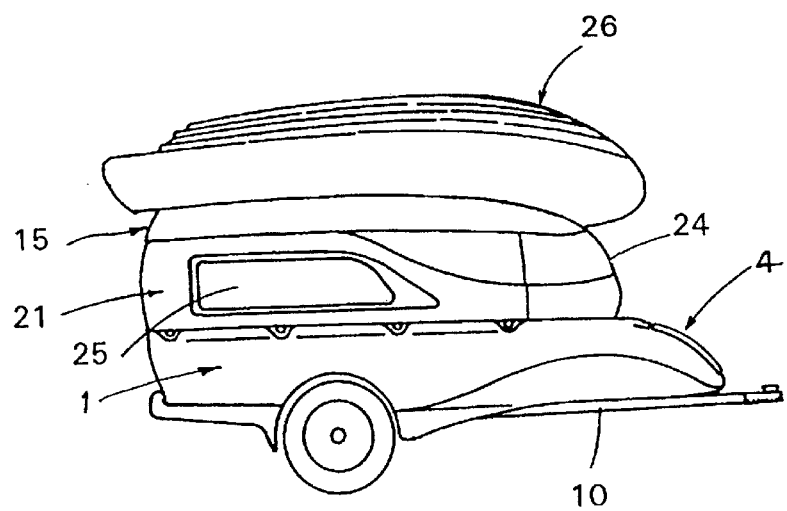
FIG. 9 is a view similar to that of FIG. 8 but applied to the trailer assembly of FIG. 6.

With reference now to FIGS. 6 and 9 of the drawings, the load carrying capacity of the trailer assembly may be increased by the provision of an optional intermediate body component 21 constructed, as an intermediate upstand, again such as by rotational moulding from the same durable rigid setting plastics material as the main body 1; as an intermediate upstanding peripheral wall assembly shaped and dimensioned to have upper and lower peripheral edge parts 21a, 21b complementary to and arranged to respectively mate with the cover component 15 lower peripheral edges and the body 1 upper peripheral edges or strip 11. Either or both of the upper and lower peripheral edge parts 21a, 21b) can be arranged for 'tongue & groove' engagement with the respective inating peripheral edge parts (15a, 11) for secure and easy attachment. In this arrangement the upper roof or cover component 15 can be fixed, detachable or hinged relative to the intermediate body component 21 and the latter component 21 arranged for secured fitment to the main body 1; and the rear end wall part 22 of the intermediate body component 21 can be separately formed and mounted to define an upper rear door for upward or sideways hinging movement to co-operate with the lower tailgate 5 and provide rear access to the trailer assembly interior. The opposite side wall parts 23 and front end (curved) wall part 24 of the intermediate component 21 can be integrally formed as one or separately formed and subsequently conjoined—preferably the latter to facilitate manufacture and minimise storage space when not in use; and the side wall parts 23 can be provided with access openings 25, which can be glazed as windows or closable by door panels if required. Where the parts 23 and 24 arc separately formed, again such as mating 'tongue & groove' joints 21c can be provided between them for strength and to facilitate assembly and disassembly.

A further optional extra for the trailer assembly is a small lightweight boat or dinghy, manufactured again predominantly by rotational moulding from the same plastics material as that of the trailer body 1 and other components as mentioned or from suitable alternative plastics materials, or combinations of materials, and shaped to locate (when inverted) as an aesthetically pleasing and close fit over the trailer assembly upper roof or cover component 15.

Figure 7:
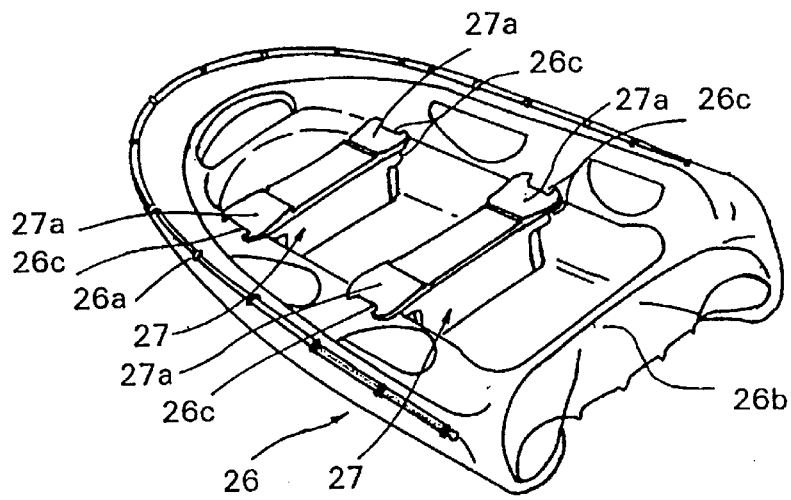
FIG. 7 is a rear/side perspective view of one form of dinghy suitable as an optional addition to the trailer assembly.
Figure 8:
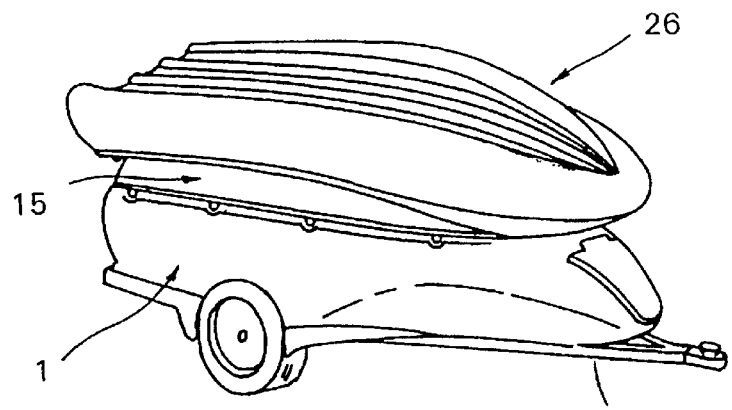
FIG. 8 is a front/side perspective view showing the dinghy of FIG. 7 inverted and fitted to the trailer assembly of FIGS. 2 and 3.

Referring particularly now to FIGS. 7, 8 and 9 of the drawings, the dinghy 26 may take the shape indicated and have its upper outer periphery 26a complementary to the shape of the cover component outer and upper side surfaces with which it will engage; and any suitable securing and/or locking means can be employed to secure the dinghy 26 in position for travelling and storage and for example means engageable with the trailer roof racks 20 can be employed. Resilient cushioning pads or strips (not shown) can be employed at the dinghy upper peripheral edge parts 26a in contact with or possibly likely to contact the trailer upper cover component 15 outer surfaces.

The dinghy 26 may be formed in sections for subsequent joining to form air pockets in the body thereof (or such as foamed polystyrene filled pockets or parts) for buoyancy and lightweightness; and separately formed detachable seat bench units 27 with upper shaped laterally projecting wing ends 27a (for engaging inner side parts of the dinghy 26) can be provided. The wing ends 27a being detachably located in opposite side recesses 26c formed in the dinghy inner side parts. The seat bench units 27 may also define compartments or containers for containing articles and/or fuel and the rear end part 26b of the dinghy 26 can be adapted to support a small outboard motor for propulsion—the seat units 27 and motor (not shown) being storable in the trailer assembly when not in use and for travel.

Coloured plastics materials are preferably utilised for the trailer assembly components, or most of them, (other than tile trailer sub-frame or chassis and wheels etc) to dispense with painting requirements; but neutral colour plastics can be employed for subsequent painting if preferred. The plastics materials utilised can also (in the liquid state) be provided with reinforcing fibres (eg glass or carbon fibres) for added strength.

Thus, by this invention there is provided a versatile and economically produced trailer and trailer assembly meetingt the stated objects of the invention. Some particular aspects of the invention have been described by way of example and with reference to the accompanying drawings, but it will be appreciated that other variations of and modifications to the invention can take place without departing from the scope of the appended claims. The invention is not restricted in size and different size assemblies can be provided (with some parts interchangeable in at least some cases for economy in manufacture and lowered selling price), for intended towing by and behind a large motorcycle (particularly a three or four wheel off road motorcycle), a family motor car or larger on or off road vehicle; and with the option of small versions for towing behind adult pedal cycles/tricycles; and/or smaller versions thereof as childs playthings towing behind childrens cycles and tricycles or toy versions of such trailer vehicles.

What is claimed is:

1. A vehicle trailer unit having an integrally formed main body including a floor with conjoined upstanding front and side peripheral walls made of a durable substantially rigid setting plastics material; the main body being configured to be detachably fitted to a separately formed and provided wheeled sub-assembly for use as an assembled trailer vehicle; the main body being preformed with a transverse rear end opening between the side walls; and a separately formed tail gate component made of the same plastics material as the main body being configured for hingeably mounting at a lower peripheral edge to a rear transverse part of the wheeled sub-assembly to which the main body is to be fitted such that the tail gate component enables closure of the trailer body unit rear end opening when the main body and tail gate components are mounted on the wheeled sub-assembly.

2. A trailer unit according to claim 1 further comprising a wheeled sub-assembly and a separately formed plastics rear end transverse part mounted rearward of the main body to define a rearwardly projecting ledge and bumper section for the trailer unit, a lower outer edge of the tail gate component being formed with a transverse recess enabling accommodation of the projecting ledge and bumper section and support for the tail gate component when in a horizontal open position.

3. A trailer unit as claimed in claim 2, further comprising plastics lower rear side parts complementary to and shaped to merge with the main body and bumper section mounted directly on rear side parts of the wheeled sub-assembly to define depending mud/stone guard portions behind wheels of the wheeled sub-assembly.

4. A trailer unit as claimed in claim 1 wherein the main body is detachably mounted on a wheeled sub-assembly and retainable against horizontal movement relative thereto by means of metal upstands fixedly mounted on and projecting upwardly from rear end side parts of the wheeled sub-assembly for location in apertures provided in the floor of the main body.

5. A trailer unit as claimed in claim 1 further comprising depending forward wheel arch fairings mounted at lower forward side parts of the main body to closely fit on each side of respective outer upper side parts of the wheeled sub-assembly.

6. A trailer unit as claimed in claim 1 wherein the main body has a forward end part with an enclosing inner wall defining a forward end storage compartment, the main body forward end having an access opening in an upper wall part and a hinged covering member providing access to said forward compartment.

7. A trailer unit comprising a main body including a floor with conjoined upstanding front and side peripheral configured to be detachably fitted to a separately formed and provided wheeled sub-assembly for use as an assembled trailer vehicle; the main body being preformed with a transverse rear end opening between the side walls; a separately formed tail gate component being configured such that the trail gate component enables closure of the trailer body unit rear end opening when the main body and tail gate components are mounted on the wheeled sub-assembly; and a unitary plastics upper cover component for fitment to the main body, the cover component having an upper roof part and integral depending and inclined opposite side wall parts, a conjoining transverse rear end wall part, and a forwardly sloping and inwardly tapering rounded forward end; the shape size and arrangement providing that the lower peripheral edge portions of the cover component are closely complementary to and can locate and snugly fit over upper peripheral edge portions of the trailer main body side wall and front end parts, and a tail gate upper peripheral edge, to provide a substantially streamlined bullet shaped appearance to the trailer unit when the cover component is fit upon the main body.

8. A trailer unit as claimed in claim 7, wherein the cover component is detachable from said main body and is adapted for flotation and use as a small dinghy/boat when inverted.

9. A trailer unit as claimed in claim 7, wherein the cover component is hingeably mounted on the main body by means of forwardly mounted opposite side pairs of strut hinge members enabling lifting and opening of the cover component from the rear end of the main body and including upward bias means assisting lift and opening of the cover component and retention of the cover component in the open positions and means to secure the cover component in a lowered closed position relative to the main body.

10. A vehicle trailer unit comprising a main body including a floor with conjoined upstanding front and side peripheral configured to be detachably fitted to a separately formed and provided wheeled sub-assembly for use as an assembled trailer vehicle; the main body being preformed with a transverse rear end opening between the side walls; a separately formed tail gate component being configured such that the trail gate component enables closure of the trailer body unit rear end opening when the main body and tail gate components are mounted on the wheeled sub-assembly; a unitary plastics upper cover component for fitment to the main body, the shape, size and arrangement such that the lower peripheral edge portions of the cover component are closely complementary to and can locate the snugly fit over upper peripheral edge portions of the trailer main body side wall and front end parts, and a tail gate upper peripheral edge; and an intermediate body component constructed by moulding from the same rigid setting plastics material as the main body having upstanding peripheral walls with upper and lower peripheral edge portions respectively complementary to lower peripheral edge portions of the cover component and upper peripheral edge portions of the main body so as to be capable of insertion and fitment between the main body and cover component to increase the load carrying capacity of the trailer body unit.

11. A trailer unit as claimed in claim 10, wherein the intermediate body component has integrally formed opposite side and front end wall parts.

12. A trailer unit as claimed in claim 10, wherein the intermediate body component is formed with separate opposite side wall and front end parts having mating joints and arranged for assembly as one intermediate component on fitment to the main body.

13. A trailer unit as claimed in claim 10 wherein the intermediate component has a separately formed rear end wall hingeable mounted between rear end portions of intermediate component opposite side wall parts to define an upwardly hingeable access door at the rear end of the trailer unit.

14. A trailer unit as claimed in claim 10 wherein intermediate component opposite side wall parts are provided with glazed openings for viewing of the main body unit contents and with at least one opening being openable for access to the interior of the main body.

15. A trailer unit as claimed in claim 10 wherein the intermediate component is provided with at least one access opening closable by a door panel disposed within one of its upstanding walls.

16. A trailer unit as claimed in claim 2 wherein the plastics material employed in the construction ofthe main body and associated tail gate component and plastic parts is a coloured plastics material.

17. A trailer body unit and a trailer assembly as claimed in claim 2 wherein the plastics material utilised in the construction of the main body and associated tail gate component and plastic parts is, in its liquid pre-setting state, provided with reinforcing fibres.

18. A trailer unit as claimed in claim 7 further comprising a small lightweight dinghy boat being manufactured primarily from the same plastics material as the trailer main body and having a size and general shape complementary to the cover component with upper peripheral edge parts conforming with and shaped to locate as a close fit over upper outer surface parts of the cover component when inverted and fitted thereover, and releasable securing means for securing the dinghy boat in its inverted position on the cover component.

19. A trailer unit as claimed in claim 18, wherein said dinghy boat is provided with separately formed detachable bench seat components having lateral end wing parts engageable with complementary inner recesses formed in longitudinal inner side parts of the dinghy boat; the bench seat components being houseable in the trailer main body for travel.

20. A trailer unit as claimed in claim 19, wherein at least one of said dinghy boat bench seats defines a storage container.

21. A trailer unit as claimed in claim 1 further comprising a wheeled sub-assembly upon which the main body and tail gate component are mounted.

22. A trailer unit as claimed in claim 7 further comprising a wheeled sub-assembly upon which the main body and tail gate component are mounted.

\* \* \* \* \*